(12) United States Patent
Kaufman et al.

(10) Patent No.: US 8,182,560 B2
(45) Date of Patent: May 22, 2012

(54) METHOD FOR GASIFYING HYDROCARBON MATERIALS FOR THE PRODUCTION OF HYDROGEN

(76) Inventors: Thomas W. Kaufman, Panama City, FL (US); Verner Christensen, Panama City, FL (US)

( * ) Notice: Subject to any disclaimer, the term of this patent is extended or adjusted under 35 U.S.C. 154(b) by 993 days.

(21) Appl. No.: 11/897,043

(22) Filed: Aug. 29, 2007

(65) Prior Publication Data
US 2009/0056224 A1    Mar. 5, 2009

(51) Int. Cl.
| | |
|---|---|
| C01B 3/36 | (2006.01) |
| C01B 6/24 | (2006.01) |
| C10J 3/46 | (2006.01) |
| B01J 7/00 | (2006.01) |
| H02N 3/00 | (2006.01) |
| G21D 7/02 | (2006.01) |

(52) U.S. Cl. ............ 48/197 R; 48/61; 423/644; 310/10; 310/11

(58) Field of Classification Search .......... 48/61, 197 R; 423/644; 310/10, 11
See application file for complete search history.

(56) References Cited

U.S. PATENT DOCUMENTS

| | | | | |
|---|---|---|---|---|
| 4,185,213 | A | * | 1/1980 | Scannell .................... 310/11 |
| 4,345,173 | A | * | 8/1982 | Marchant et al. .............. 310/11 |
| 6,827,751 | B2 | | 12/2004 | Kaufman et al. |
| 2001/0015060 | A1 | * | 8/2001 | Bronicki et al. ............... 60/39.6 |
| 2004/0052724 | A1 | * | 3/2004 | Sorace ..................... 423/648.1 |
| 2008/0034658 | A1 | * | 2/2008 | Heiser et al. .................... 48/77 |

* cited by examiner

Primary Examiner — Matthew Merkling
(74) Attorney, Agent, or Firm — J. Wiley Horton

(57) ABSTRACT

A process for gasifying hydrocarbon-containing materials and separating the resultant stream into hydrogen gas and other useful products.

9 Claims, 6 Drawing Sheets

METHOD FOR GASIFYING HYDROCARBON MATERIALS FOR THE PRODUCTION OF HYDROGEN

BACKGROUND OF THE INVENTION

1. Field of the Invention

This invention relates to the field of gasification of hydrocarbon-containing solids, liquids and gases. More specifically, the invention comprises a process for gasifying hydrocarbon materials and rendering them suitable for use in combustion processes or petrochemical processes.

2. Description of the Related Art

Ideal combustion often requires that the fuel material be ignited as a gas, liquid, or finely particulated solid. When this is true, advanced technology can be employed to regulate the combustion process and eliminate or reduce the production of pollutants. Complex solids can then be combusted in a controlled fashion.

Many solid hydrocarbon fuels are available at relatively low cost. One good example is coal, which exists in a wide variety in terms of concentration and the presence of unwanted impurities. Coal is typically burned in power plants to produce electricity. Unfortunately, it is really only suitable for use in large fixed installations (power plants) or large and complex moving installations (coal-fired ships or steam locomotives). The use of coal in a smaller application—such an automobile—is impractical.

Several processes have been developed to convert solid coal into a more usable form—commonly known as "coal gasification." While these processes work, they often consume more energy in the conversion than is available in the final product. They have also been quite complex and difficult to maintain.

Processes to gasify other types of hydrocarbon-containing solids and liquids are also known in the prior art, typically concentrating on the recycling of used solids such as rubber tires and unrefined liquids such as crude oils. These processes have also been quite complex and of marginal economic worth. In addition, other prior art gasification processes produce greenhouse gases and other pollutants as byproducts.

BRIEF SUMMARY OF THE INVENTION

The present invention comprises a process which is capable of gasifying a variety of hydrocarbon-containing materials. The resulting gas is suitable for use in various combustion processes and for petrochemical processes. A hydrocarbon-containing material is mixed with natural gas (or other suitable hydrocarbon gas) under pressure. The suspended material and gas are then injected under pressure into an accelerator/gasifier. Intense heat (provided by an external energy source) is applied to the mixture as it travels through the gasifier, resulting in the cracking of the hydrocarbon chains and the release of additional energy. The released bond energy, along with the addition of the external energy, rapidly expands the gas and causes the velocity of the moving mixture to rise sharply as it proceeds down the tube of the gasifier.

The accelerator/gasifier tube is connected to a magnetohydrodynamic generator which generates electricity and removes free electrons from the stream. From the magnetohydrodynamic generator, the resultant stream is transmitted to a decelerator/heat exchanger which cools the stream to approximately 700 degrees Celsius. Hydrogen and usefully hydrocarbon gases are eventually separated from the stream.

REFERENCE NUMERALS IN THE DRAWINGS

| | | | |
|---|---|---|---|
| 10 | mixer | 12 | gas supply |
| 14 | injector | 16 | microwave |
| 18 | heavy hydrocarbon storage | 20 | accelerator/gasifier |
| 22 | microwave | 24 | MHD generator |
| 26 | electricity | 28 | decelerator/heat exchanger |
| 30 | metals | 32 | particulate refiner |
| 34 | heat | 36 | turbine generator |
| 38 | electricity | 40 | light hydrocarbon storage |
| 42 | reboiler | 44 | separator |
| 46 | condenser | 48 | condenser |
| 50 | hydrogen purification filter | 52 | hydrogen storage |
| 54 | inlet | 56 | inlet flange |
| 58 | first expansion nozzle | 60 | refractory shell |
| 62 | tube supports | 64 | heating elements |
| 66 | housing | 68 | outlet flange |
| 70 | inlet flange | 72 | gas inlet |
| 74 | gas cooling jacket | 76 | second expansion nozzle |
| 78 | gas outlet | 80 | liquid inlet |
| 82 | liquid cooling jacket | 84 | solids collection outlet |
| 86 | cooled gas outlet | 88 | outlet flange |
| 90 | liquid outlet | 92 | coal and natural gas |
| 94 | cracked natural gas and softened coal | | |
| 96 | first acceleration phase | 98 | second acceleration phase |
| 100 | gasification phase | 102 | hot gas |
| 104 | centrifuge | 106 | carbon particulates |
| 108 | gas flow | 110 | conduit |
| 112 | insulator walls | 114 | anode |
| 116 | insulators | 118 | load |
| 120 | cathode | | |

DETAILED DESCRIPTION OF THE INVENTION

Figure 1:
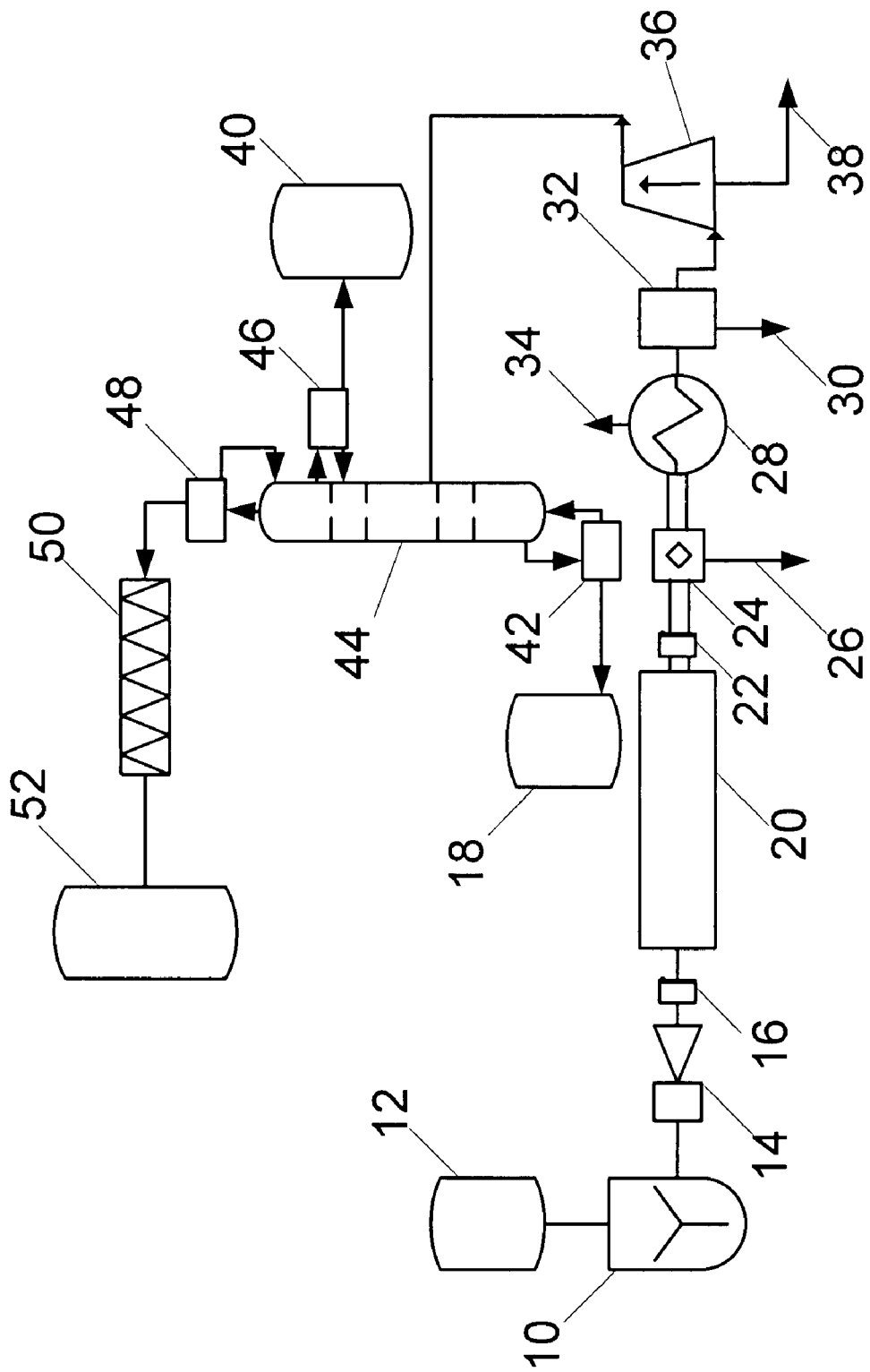
FIG. 1 is a schematic view, showing the present invention.

FIG. 1 depicts the process of the present invention. The reader should appreciate that the present process can be used to gasify solids, liquids, or a combination of the two (a "slurry"). In this initial example, a solid will be employed. A finely-ground hydrocarbon-containing solid is fed to mixer 10. Natural gas or other light hydrocarbon gas is also fed into mixer 10 from gas supply 12. The entire system is pressurized. Thus, those skilled in the art will know that the gas must be fed in under pressure and the solid material must be fed in under pressure.

Mixer 10 disperses the hydrocarbon-containing solid into the natural gas, and delivers the stream through injector 14 into microwave 16 and then on to accelerator/gasifier 20. Microwave 16 is used to "jump start" the heating process before the mixture is passed to accelerator/gasifer 20. Microwave 16 is a continuous feed device. A multi-head LASER such as an 8-beam-point multi-head laser, may be used in conjunction with or in place of microwave 16 to preheat the mixture. The mixture is further heated within accelerator/gasifier 20. It undergoes a transformation process—which will be described subsequently—before passing through microwave 22. Accelerator/gasifier 20 receives the feed from mixer 10 at a temperature of approximately 10-20 degrees Celsius. The stream is heated to approximately 1700 degrees Celsius in accelerator/gasifier 20.

Microwave 22 provides further energy to the stream before the components are transferred to magnetohydrodynamic ("MHD") generator 24. MHD generator 24 uses the enthalpy or kinetic energy of the stream to generate electricity 38. Those that are skilled in the art know that an MHD generator generates electric current from a high-temperature, conductive gas passing through a magnetic field. The removal of free electrons by MHD generator 24 facilitates the separation of components of the stream further "downstream." The removal of free electrons also allows for subsequent cooling and separation of the components without any "reforming" (due to the reversibility of the reactions based upon the post-gasification environment). Because of this, the final separated products streams are nearly pure in composition.

Figure 6:
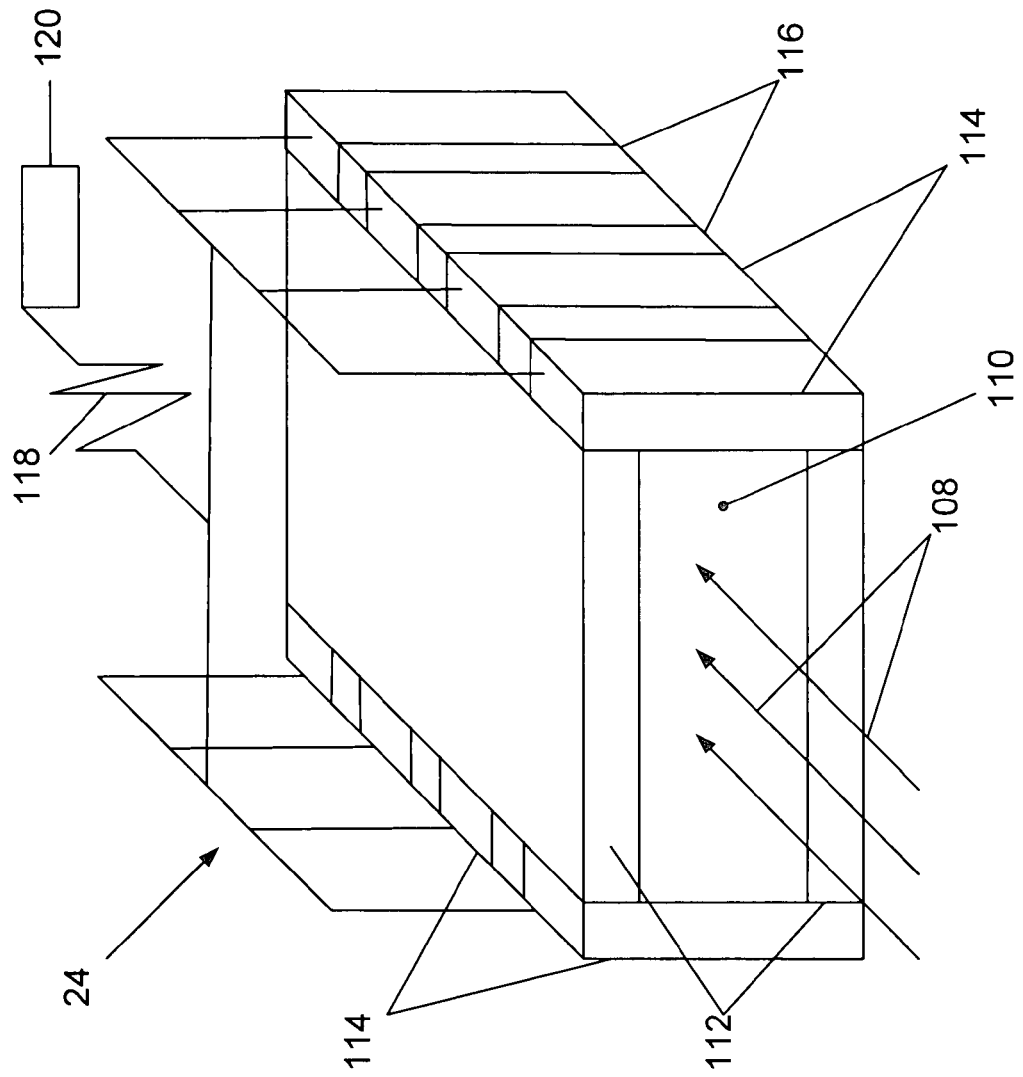
FIG. 6 is a perspective view, showing a magnetohydrodynamic generator.

FIG. 6 shows one possible configuration for MHD generator 24. Hot gases 108 leaving gasifier 20 and/or microwave 22 pass through conduit 110. A series of anodes 114 align the side walls of conduit 110. Each anode is separated from adjacent anodes by an insulator 116. Insulator walls 112 extend across the top and bottom of conduit 110 and connect to the side walls. Each anode 114 is electrically connected to cathode 120 through load 118. As hot gases 108 pass through conduit 110, free electrons are collected by anode 114 and transmitted to cathode 120. There are many potential uses for these electrons, including AC or DC power. The electrons may also be transmitted to an electron accumulator for use with an electron beam or may be used as a supply for negative ion source devices.

Referring back to FIG. 1, the stream is transmitted from MHD generator 24 to decelerator/heat exchanger 28 where heat 34 (thermal energy) is extracted from the stream. Heat 34 may be used for a variety of purposes such as feeding it into a boiler to generate electricity. Decelerator/heat exchanger 28 cools the stream from approximately 1700 degrees Celsius at the inlet to approximately 700 degrees Celsius at the outlet. From decelerator/heat exchanger 28, the stream is transmitted to particulate refiner 32 where solids (including metals) are removed from the stream. Metals 30 are stockpiled in storage for further processing or use. Once solid particulates are removed from the stream, the stream is transmitted to turbine generator 36 where the kinetic energy of the stream is used to generate electricity 38.

From turbine generator 36, the stream is transmitted to separator 44 where hydrogen gas is reverse distilled from the stream. "Heavier" hydrocarbon gases are condensed out of the stream in separator 44. The reverse distillation may be accomplished using selective-membrane separators, staged-separation vessels or other suitable reverse distillation means. The reverse distillation may also be accomplished using combinations of these types of equipment. Separator 44 receives the stream at an inlet temperature of approximately 650 degrees Celsius and the hydrogen stream from condenser 48 is approximately 15 degrees Celsius.

In FIG. 1 a staged-separation vessel is illustrated. Condenser 48 separates the stream coming from separator 44 into a liquid stream and a gas stream. The liquid stream is returned to the top stage of separator 44 and the gas stream (which includes hydrogen and light hydrocarbons such as methane) is transmitted to hydrogen purification filter 50. Condenser 46 receives a portion of the vapor from an intermediate stage and separates the vapor into a liquid stream which is returned to separator 44 and a vapor stream which is sent to light hydrocarbon storage 40. The liquid stream exiting the bottom of separator 44 is transmitted to reboiler 42. Reboiler 42 separates the liquid stream into a vapor stream and a liquid stream. The vapor stream is reinjected into the bottom of separator 44 and the liquid stream is sent to heavy hydrocarbon storage 18.

Those that are skilled in the art know that the heat-driven reverse distillation of hydrogen from light hydrocarbon is energy intensive and expensive. Thus, staged-separation equipment may only be practical to separate relatively heavy hydrocarbons from light hydrocarbons and hydrogen. Hydrogen purification filter 50 includes membrane separators with hydrogen-selective qualities to separate hydrogen from light hydrocarbons. Although not illustrated in FIG. 1, the light hydrocarbons may be stored or returned to mixer 10 for reprocessing. The purified hydrogen is sent to hydrogen storage 52.

The reader will note that the foregoing process does not produce any "greenhouse gases" or pollutants. In addition, none of the materials injected into the process are consumed in the gasification reaction (or any other reaction) in such a manner which would necessitate the use of exhaust stacks. Once the hydrocarbon-containing material is gasified, the stream is separated into its useful components, and electricity is generated by three separate processes: (1) by MHD generator 24, (2) by boiler using heat 34, and (3) by turbine generator 36. The process also results in useful products (such as $H_2$) which can be employed in other processes.

Figure 2:
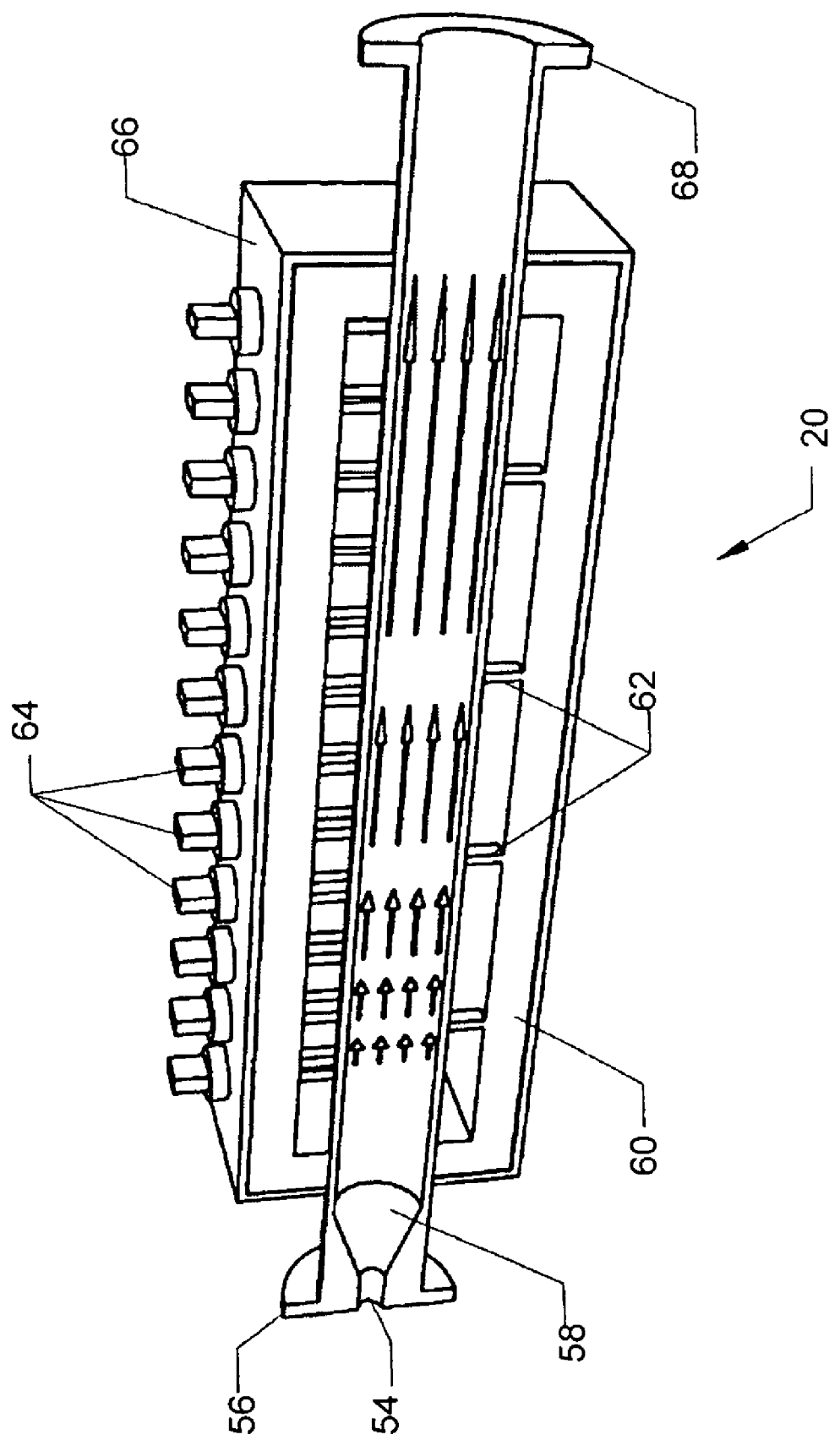
FIG. 2 is a perspective view with a cutaway, showing an accelerator/gasifier.

Several components of the present process will now be considered in greater detail. FIG. 2 shows accelerator/gasifier 20 sectioned in half to show its internal details. The unit is connected to mixer 10 by inlet flange 56. The mixture of hydrocarbon gas and solids is forced in through inlet 54. It then passes through first expansion nozzle 58. Most of the length of the gasifier tube is contained within housing 66. Refractory shell 60 surrounds the gasifier tube and insulates the metal comprising housing 66 from the extreme heat generated by a plurality of electrical heating elements 64.

A set of tube supports 62 holds the tube in position within housing 66. The wall of the cylindrical tube must have a high degree of thermal conductivity, in order to conduct heat to the gas and solids passing within the tube (essential to the processes occurring therein). It must also be capable of withstanding high temperatures. Outlet flange 68 connects accelerator/gasifier 20 to a conduit. This conduit passes the stream on to microwave 22 and MHD generator 24.

The temperature within the refractory shell is typically maintained between 2200 and 3400 degrees Fahrenheit, depending on the material to be gasified. This heat is transferred to the mixture of gases and solids being forced through the tube.

Figure 4:
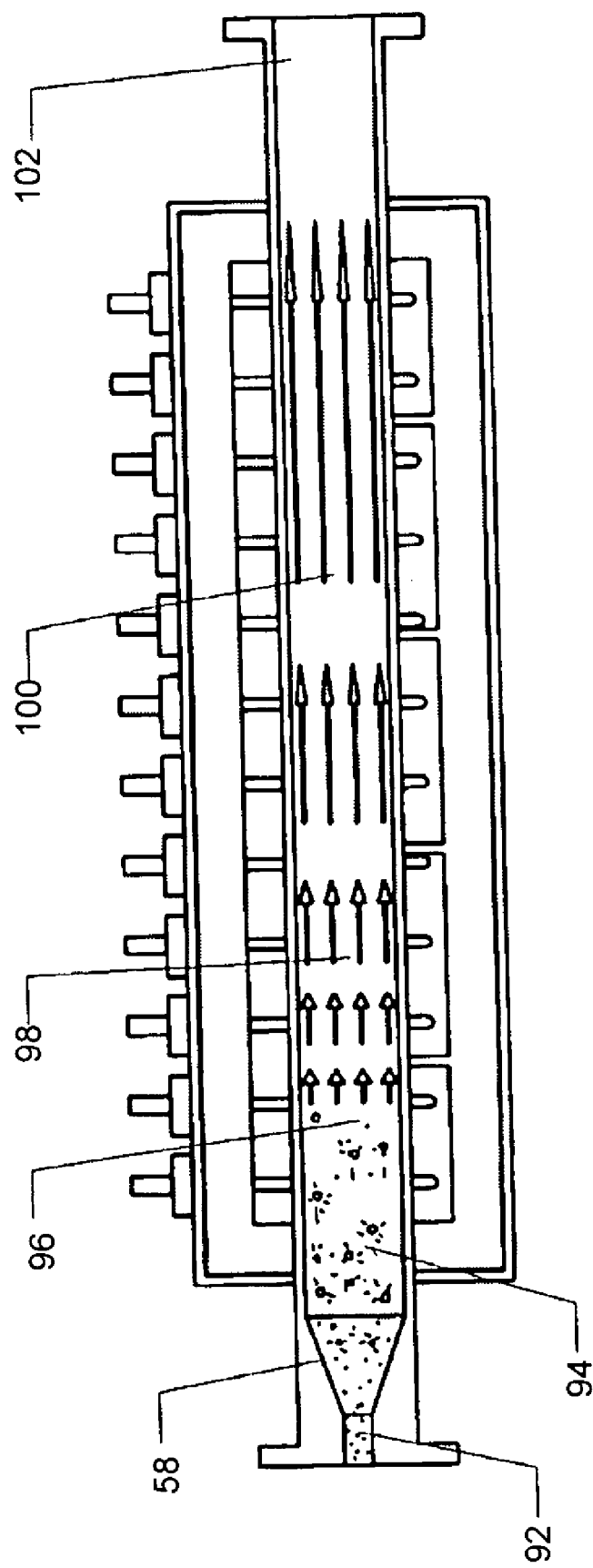
FIG. 4 is a sectional view, showing the operation of the accelerator/gasifier.

FIG. 4 graphically depicts the processes 58 occurring within the accelerator/gasifier. It is simultaneously heated. The heating adds energy to reach the activation energy needed to alter the chemical structure of the compounds present. The result is that the hydrocarbon chains within the natural gas are "cracked", thereby releasing some carbon bond energy. The coal is also broken into progressively finer particles ("softened") by the intense turbulent motion of the swirling gases. The added heat produces explosive acceleration, which further contributes to the carbon chain cracking process. The result is the region denoted as cracked natural gas and softened coal 94.

As the temperature of the mixture rises, the carbon bonds contained within the coal break, thereby releasing more potential energy. The sharply rising temperature causes the gas to expand—producing violent acceleration down the tube. This is denoted as first acceleration phase 96. The energy transferred to the mixture from heating elements 64 causes more expansion and further acceleration, denoted as second acceleration phase 98. The gases can exceed the speed of sound, forming shock waves as illustrated. A violently rotational flow typically develops as the gas accelerates down the tube.

The hydrocarbon chains within the coal ultimately break into their constituent elements, as do the hydrocarbon chains within the natural gas. This action occurs through the region marked gasification phase 100. The result is the escape of hot gas 102 out the right end of the assembly at high velocity. This hot gas, at this stage, may be composed mostly of hydrogen. Shorter-chain hydrocarbon gases may also be present (methane, ethane, etc.). Those skilled in the art will also realize that a substantial quantity of free electrons will be present (so long as the gas remains at the highly elevated temperature).

Figure 3:
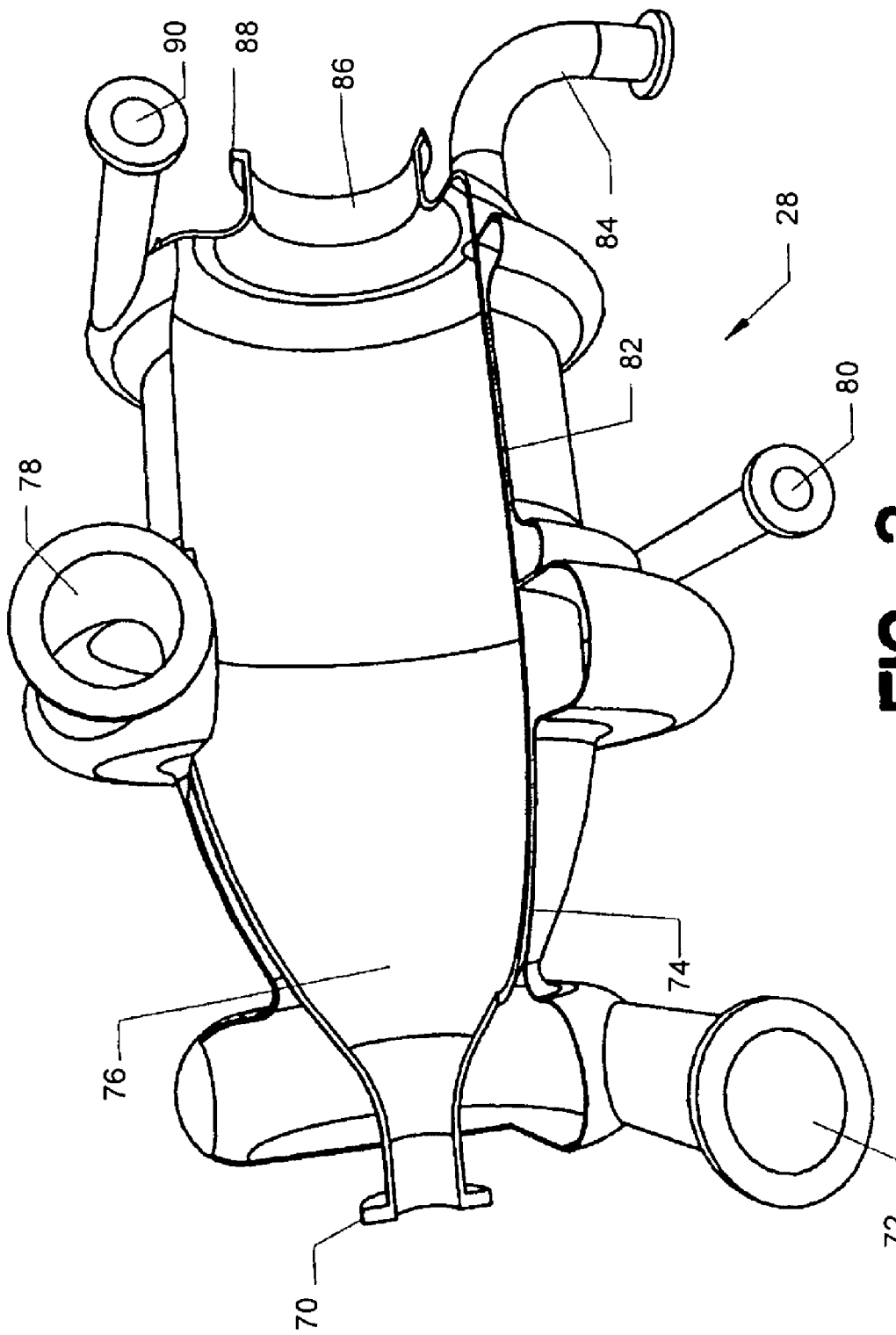
FIG. 3 is a perspective view with a cutaway, showing a decelerator/heat exchanger.

The goal of the device is to provide a continuous process. Thus, the hot gas produced must be removed and collected. After free electrons are extracted from the stream by MHD generator 24, the stream is cooled. FIG. 3 illustrates a device intended to accomplish this task. Decelerator/heat exchanger 28 assumes the form of an enclosed expansion nozzle. It is connected to the conduit exiting MHD generator 24 by inlet flange 70. The hot gases entering the device expand through second expansion nozzle 76. This process expands and cools the hot gas.

Second expansion nozzle 76 is surrounded by gas cooling jacket 74. Cool gas is forced into the jacket through gas inlet 72. It flows around a circular manifold and is forced along the bell-shaped wall of second expansion nozzle 76, where it is eventually collected in a second circular manifold and extracted through gas outlet 78. The cooling gas, which may be ambient air, can be used as a heat source for another process or simply exhausted.

Although gas cooling jacket 74 removes considerable thermal energy from the expanded gas within decelerator/heat exchanger 28, more energy must typically be removed prior to storing the gasified hydrocarbons. A second cooling stage is produced by liquid cooling jacket 82. A conductive liquid, such as water, is fed in through liquid inlet 80. The liquid flows around a circular manifold and through liquid cooling jacket 82. It is then collected in a second circular manifold and extracted through liquid outlet 90.

The cooled hydrocarbon gas is then extracted through cooled gas outlet 86. The gas may then be fed directly into particulate refiner 32 and then to turbine generator 36. An extraction pump is generally attached to cooled gas outlet 86 (via outlet flange 88) in order to maintain flow in the system. Those skilled in the art will realize that the gas extraction can be accomplished using multiple pumps attached to multiple gas outlets.

Although nearly all of the hydrocarbon-containing solid will be converted to a gas, some solid materials (such as silicon) will remain. Some of these materials may collect in the bottom of decelerator/heat exchanger 28. Solids collection outlet 84 is provided for the removal of these materials. It is attached to an accumulation unit, from which the solids must periodically be collected.

Those skilled in the art will know that the hydrocarbon gas present at this point in the process may be different from the one fed into the accelerator/gasifier tube. The extreme temperatures and violent kinetic action tends to break down longer carbon chains ("cracking"). As an example, if the feed gas is propane (containing a molecule with a carbon chain which is three carbon atoms long), the gas may be very nearly transformed into free hydrogen and methane (containing only a single carbon atom per molecule) by the time it reaches the end of the accelerator/gasifier tube. Both the input and output gas include hydrocarbon gases, but they are not the same gases. For purposes of clarity, the gas exiting the accelerator/gasifier tube will be referred to as a "resultant gas."

Various other conventional components have not been illustrated. For instance, as explained previously, the solid material must be pressurized in order to feed into mixer 10. This pressurization component has not been illustrated.

Although coal has been used in the preceding example, other solid materials can be substituted. As a second example—used rubber tires can be employed as the hydrocarbon-containing solid. Different mechanical hardware is needed to shred used tires to an appropriate particle size, but the process is otherwise similar.

The process is not limited to the use of hydrocarbon-containing solids, however. Hydrocarbon-containing liquids, such as crude oil and oil contained in "Distiller's dried grains" (a byproduct of ethanol production processes), can also be employed. In many respects the use of such a liquid simplifies the process, since it is easier to disperse the liquid into the natural gas than a finely ground solid. Combinations of liquids and solids are also possible. Finely ground coal can be mixed into crude oil to form a slurry, which is then dispersed into the natural gas and fed into accelerator/gasifier 20. A slurry can also be made by mixing shredded rubber products with crude oil.

The proposed method may also be used to drive the dissociation of methane and thus the separation of methane into carbon and hydrogen atoms. The following formula is representative of the dissociation of methane into carbon and hydrogen atoms:

$$CH_4 + \Delta H \rightarrow C^{4+} + 4H^+ + 4e^- \qquad (Eq.\ 1)$$

where $\Delta H$ represents the bond dissociation energy of methane. For a mole of methane, a $\Delta H$ of 1662 kJ is needed to break all four C—H bonds.

Figure 5:
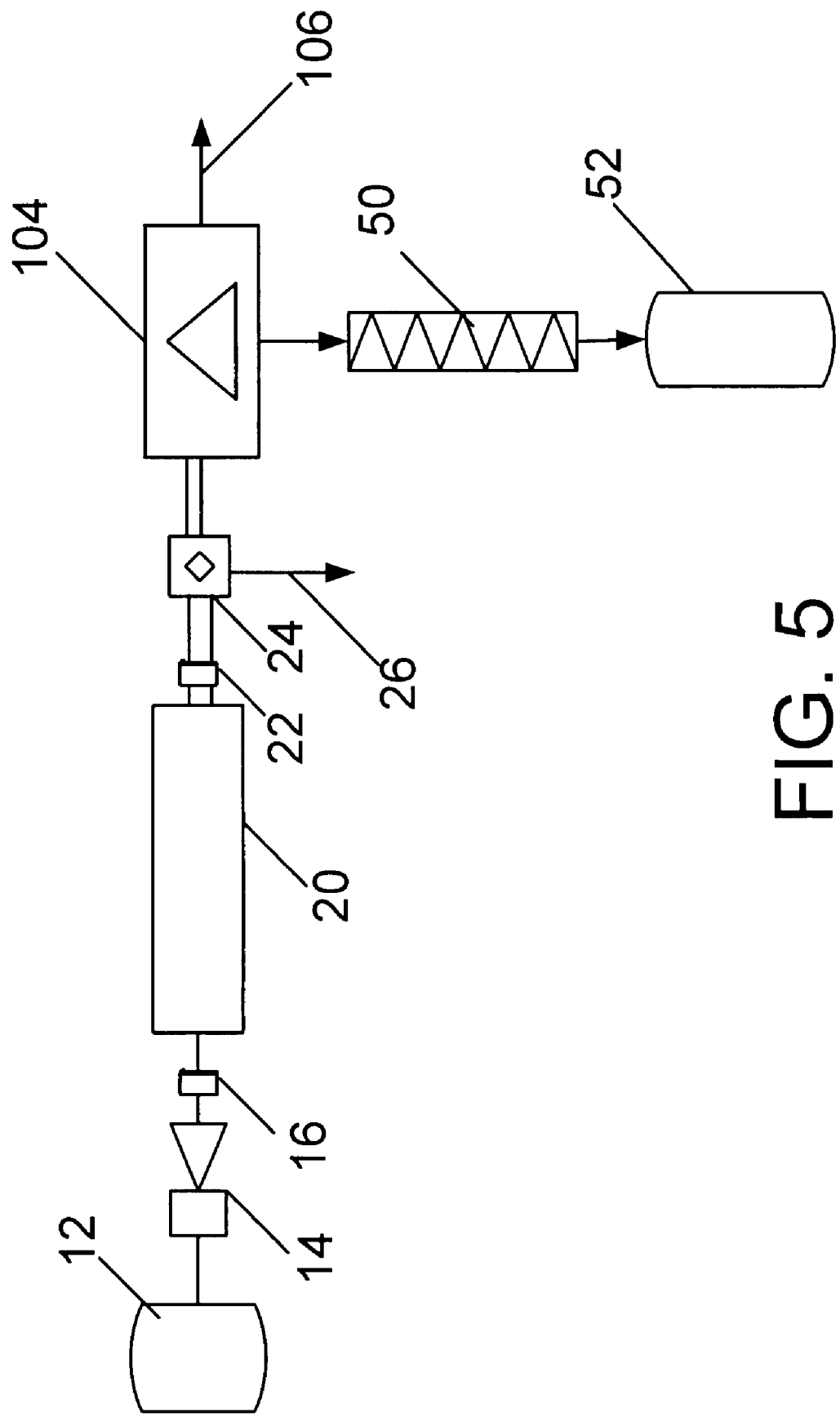
FIG. 5 is a schematic view, showing an alternate embodiment of the present invention.

As shown in FIG. 5, methane or other low molecular weight hydrocarbon gases can be injected into gasifier 20 from gas supply 12 by injector 14. In this example, no hydrocarbon solids or liquids are mixed with the gas feed. Microwaves 16 and 22 are again employed upstream and downstream of gasifier 20 in order to provide additional energy to drive the dissociation of the gas. If methane is used, sufficient heat is added by gasifier 20 to drive the dissociation of methane as shown in Eq. 1. Thus, the gas stream exiting microwave 22 contains a mixture of carbon ions, hydrogen ions, and free electrons.

This gas stream is then transmitted through MHD generator 26. MHD generator 26 strips the stream of the free electrons, thereby preventing the reformation of methane downstream. MHD generator 26 should have sufficient capacity to remove sufficient electrons to prevent the reformation of the "starting" gas (methane, in the present example). The exact size of MHD generator 26 needed is dictated by the gas feed rate into MHD generator 26 and the efficiency of the cathode-anode circuit.

The stream is then transmitted to centrifuge 104 where carbon atoms and hydrogen atoms are separated into streams of carbon particulates 106 and hydrogen. The hydrogen stream is then passed through hydrogen purification filter 50 on to hydrogen storage 52. Although centrifuge 104 is illustrated in FIG. 5, other separation devices may be used to separate carbon and hydrogen atoms including selective membranes, cyclone separators, and settlement chamber type separators. The result of the separation is a supply of carbon particulates and gaseous hydrogen. Both of these products are highly useful in many industries.

Although the specific hydrocarbon-containing examples of coal, shredded rubber, crude oil, and methane were disclosed, the reader should keep in mind that the devices disclosed could be used to gasify virtually any type of hydrocarbon-containing liquid or solid. The preceding descriptions should not be construed, therefore, as limiting the scope of the invention but rather as providing illustrations of the preferred embodiments of the invention.

Having described our invention, we claim:

1. A process for converting hydrocarbon-containing material into a resultant gas, comprising the steps of:
   a. providing a finely-ground hydrocarbon-containing solid;
   b. providing a light hydrocarbon gas;
   c. mixing said hydrocarbon-containing solid and said hydrocarbon-containing gas together to form a hydrocarbon mixture;
   d. preheating said hydrocarbon mixture;
   e. providing a gasifier, said gasifier including an acceleration tube and a heat source configured to heat said acceleration tube and the contents thereof;
   f. feeding said hydrocarbon mixture through said gasifier tube;
   g. further heating said hydrocarbon mixture emerging from said gasifier tube by passing said mixture through a microwave, wherein the heat added to said mixture in said gasifier and said microwave is sufficient to crack carbon bonds within said hydrocarbon mixture in order to form a resultant mixture containing shortened hydrocarbon chains, free hydrogen, and free electrons;
   h. providing a magnetohydrodynamic generator, said magnetohydrodynamic generator having a conduit fluidly connected with said microwave;
   i. passing said resultant mixture through said magnetohydrodynamic generator, said magnetohydrodynamic generator containing an anode configured to collect said free electrons from said resultant mixture passing through said conduit, said anode configured to transmit said free electrons away from said conduit;
   j. providing a decelerator/heat exchanger;
   k. after said resultant mixture gas stream has passed through said magnetohydrodynamic generator, passing said resultant mixture through said decelerator/heat exchanger wherein a velocity and a temperature of said resultant mixture are reduced in the absence of said free electrons;
   l. removing solids from said resultant mixture to create a resultant gas;
   m. removing hydrogen gas and hydrocarbon gas from said resultant gas; and
   n. storing said hydrogen gas and said hydrocarbon gas.

2. The process of claim 1, wherein said gasifier and said microwave heats said resultant gas stream to at least approximately 1700 degrees Celsius before transmitting said resultant gas stream through said magnetohydrodynamic generator.

3. The process of claim 1, wherein said decelerator/heat exchanger cools said resultant gas stream to at least approximately 700 degrees Celsius.

4. The process of claim 1, wherein said hydrocarbon-containing gas comprises methane.

5. The process of claim 4, wherein said gasifier breaks hydrocarbon bonds of said methane and thereby dissociates said methane into hydrogen atoms, carbon atoms, and said free electrons.

6. The process of claim 4, wherein said magnetohydrodynamic generator removes a sufficient quantity of said free electrons to prevent the reformation of said methane downstream of said magnetohydrodynamic generator.

7. The process of claim 5, further comprising the steps of:
   a. providing a separator configured to separate said carbon atoms from said hydrogen atoms in said resultant mixture, said separator downstream of said magnetohydrodynamic generator; and
   b. separating said carbon atoms from said hydrogen atoms present in said resultant mixture in said separator such that said hydrogen atoms and said carbon atoms are separately recovered from said resultant mixture.

8. A process for converting hydrocarbon-containing material into a resultant gas as recited in claim 1, wherein said step of preheating said hydrocarbon mixture is performed by passing said hydrocarbon mixture through the convergence of a plurality of laser beams.

9. A process for converting hydrocarbon-containing material into a resultant gas as recited in claim 1, wherein said step of preheating said hydrocarbon mixture is performed by supplying a second microwave and passing said hydrocarbon mixture through said second microwave before introducing said hydrocarbon mixture into said accelerator/gasifier.

* * * * *